S. OTIS.
DUMP CAR.
APPLICATION FILED JULY 5, 1907.
930,790.
Patented Aug. 10, 1909.
2 SHEETS—SHEET 2.
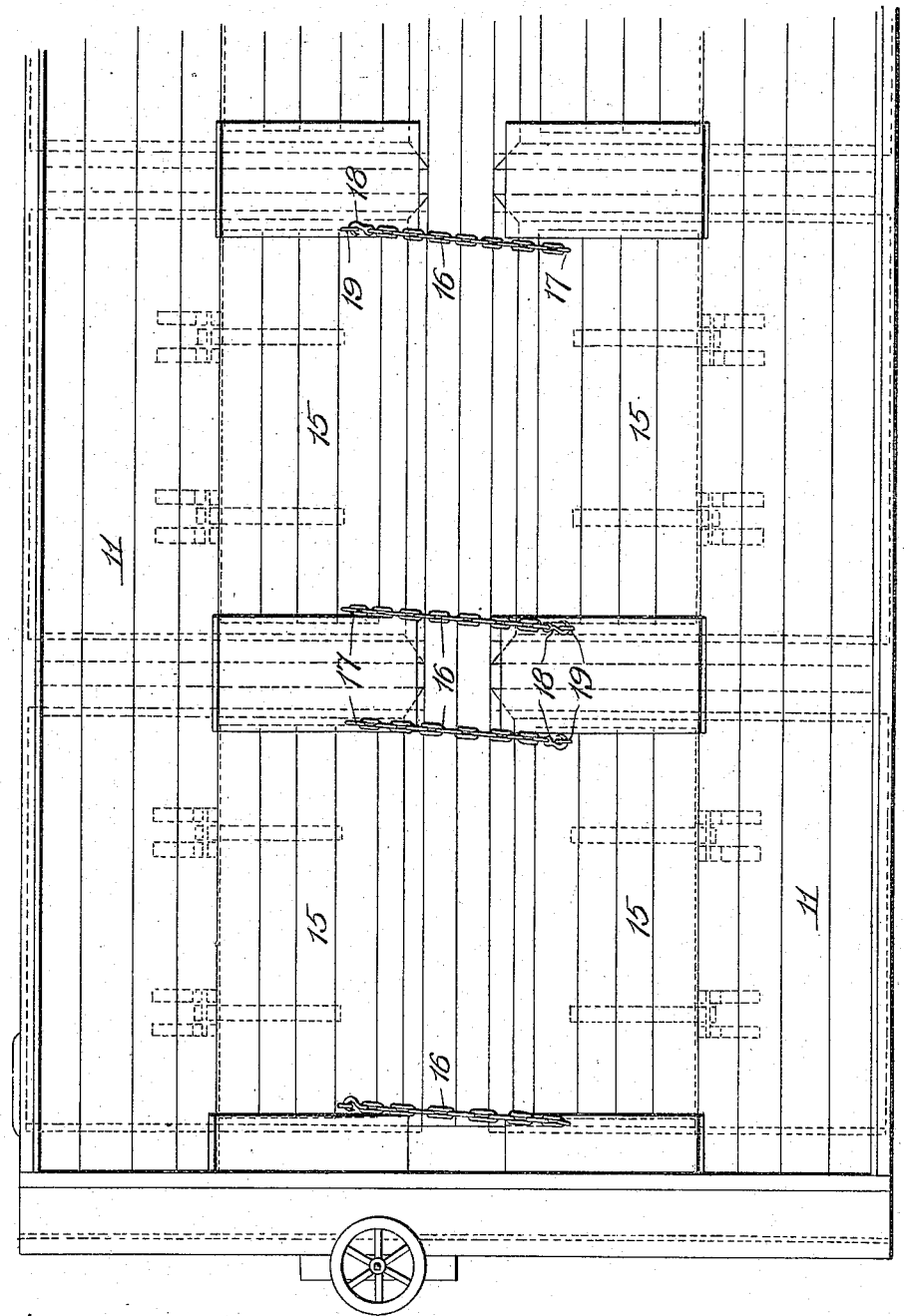
Witnesses:
Inventor:
Spencer Otis,
By Sheridan & Wilkinson,
Attys.

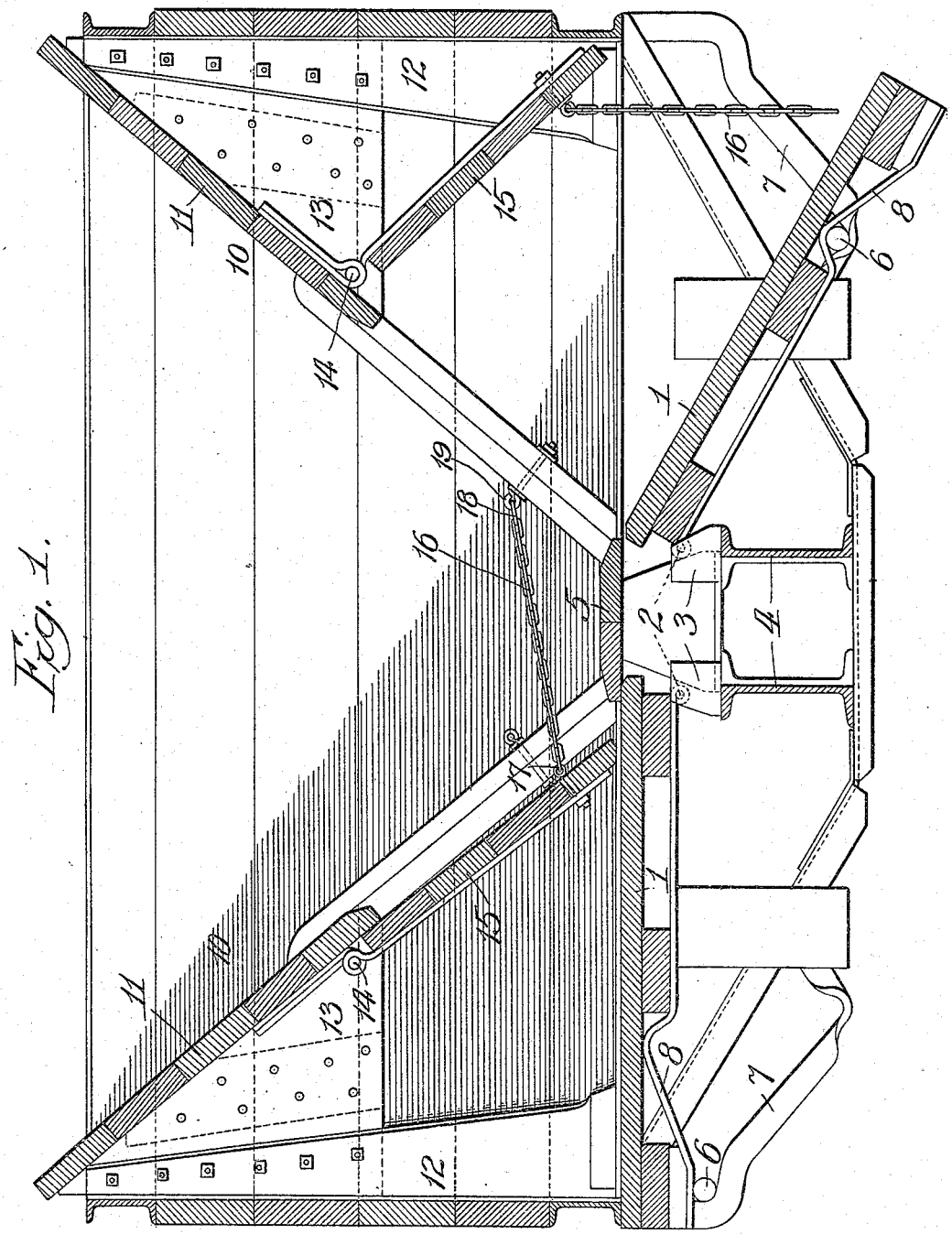

UNITED STATES PATENT OFFICE.

SPENCER OTIS, OF CHICAGO, ILLINOIS, ASSIGNOR TO NATIONAL DUMP CAR COMPANY, OF CHICAGO, ILLINOIS, A CORPORATION OF MAINE.

DUMP-CAR.

No. 930,790.   Specification of Letters Patent.   Patented Aug. 10, 1909.

Application filed July 5, 1907. Serial No. 382,228.

*To all whom it may concern:*

Be it known that I, SPENCER OTIS, a citizen of the United States, residing at Chicago, in the county of Cook and State of Illinois, have invented certain new and useful Improvements in Dump-Cars, of which the following is a specification.

The object of my invention is to provide means whereby a gondola car provided with dump doors in the floor thereof may discharge the entire load at either side of the track.

In the drawings—Figure 1 is a cross section of a car embodying my invention. Fig. 2 is a plan view of part of a car equipped with my invention.

My invention is designed primarily for use in connection with a gondola dump car of the form shown in Fig. 1. The floors of cars of this type consist substantially wholly of dump doors hinged adjacent the longitudinal center of the car, the two rows of doors being separated by a center-board running the length of the car. In the car shown in the drawings the dump doors 1 are hinged at 2 upon plates 3 supported by the center sill 4. Above the center sill and running throughout the length of the car is the usual center-board 5. My invention may be applied in any car having doors of this type, however operated. In the present instance I have shown operating mechanism of a common type, consisting of a longitudinal shaft 6, adapted to move transversely of the car upon the inclined tracks 7 and to bear also upon the tracks 8 secured to the under side of the doors. Any suitable means of the character now in use may be employed for imparting transverse movement to the shaft 6. It will be obvious that when the shaft is moved toward the center of the car to the position illustrated at the right-hand of Fig. 1, the dump door will drop by gravity, and that when the shaft is moved outwardly to the position shown at the left of Fig. 1, the doors will be closed. Usually several doors are operated by a single shaft, the most common arrangement being to operate half of the doors on each side of the car by means of a single shaft.

It will be apparent that an ordinary gondola car with vertical sides and a horizontal bottom provided with dump doors cannot be used for the purpose of discharging all of the load at either side of the track. In order to effect this end, therefore, I have provided supplemental inclined sides designated generally by the numeral 10. The supplemental sides incline upwardly and outwardly from a point near the center of the car to the upper part of the vertical side of the car. In the present instance I have shown the supplemental side as extending from the edge of the center-board 5 to the upper part of the vertical side of the car. The upper parts 11 of the supplemental sides are stationary, being secured to the ends of the car and to the side stakes 12 by means of braces 13. The inclined sides are provided with door openings extending from the center-board upwardly. The doors for closing these openings are hinged at their upper edge to the lower part of the side at 14 and are adapted to swing outwardly from the position shown at the left of Fig. 1 to that shown at the right. When in closed position, the supplemental doors 15 are supported by the main dump doors 1, as shown at the left of Fig. 1. When the main dump doors are permitted to drop the supplemental doors 15 are left unsupported and fall to their open position by their own weight and that of the superimposed load in the car. In Fig. 1 of the drawings the doors are shown in the position occupied when the load in the car is being discharged at the right-hand side thereof. The main dump door 1 when open extends in substantially the same direction as the opposite side of the car, thus permitting the entire load to slide downwardly and outwardly to the right-hand side of the car. In case it were desired to construct a car capable of discharging its load at one side only, it would not be necessary to provide supplemental doors upon the side where the load was not to be discharged. Upon that side the supplemental side could be made continuous and rigid from top to bottom. In the drawings, however, I have illustrated the preferred form in which the car is capable of discharging its load at either side.

It will be obvious that it is necessary to provide some means for holding the supplemental doors 15 temporarily in closed position previous to the raising of the main doors 1. For this purpose I have provided chains 16 attached at one end to the fixed part of the supplemental car side at 17 and provided at their ends with hooks 18, adapted to be inserted in eyelets 19 secured to the supplemental doors. After the car has been emptied, the supplemental doors are raised to closed position and temporarily fastened by means of the chains 16. The main doors 1 are then raised, and the chains 16 unhooked before reloading the car.

It will be obvious from the foregoing that I have provided a cheap and efficient method for transforming an ordinary gondola dump car into a car capable of discharging the entire load by gravity at either side of the track.

What I claim is:

1. In a gondola car, dump doors hinged adjacent the longitudinal center thereof, and supplemental sides sloping upwardly and outwardly from the central portion of the car, the lower part of said supplemental sides containing supplemental dump doors hinged at their upper edges and adapted to be supported at their lower edges when closed by the main dump doors.

2. In a gondola car, dump doors hinged adjacent the longitudinal center of the floor, and a supplemental side sloping upwardly and outwardly from the central part of the car, said supplemental side containing supplemental dump doors hinged at their upper edges.

3. In a gondola car, dump doors hinged adjacent the longitudinal center thereof, supplemental sides sloping upwardly and outwardly from the central portion of the car, said supplemental sides extending throughout the length of the car, side stakes, and braces extending from said side stakes to the supplemental sides, the lower part of said supplemental sides containing supplemental dump doors hinged at their upper edges and adapted to be supported at their lower edges when closed by the main dump doors.

4. In a gondola car, dump doors hinged adjacent the longitudinal center thereof, supplemental sides sloping upwardly and outwardly from the central portion of the car, the lower part of said supplemental sides containing supplemental dump doors hinged at their upper edges and adapted to be supported at their lower edges when closed by the main dump doors, and means for temporarily holding said supplemental doors closed while the main doors are open.

5. In a gondola car, dump doors hinged adjacent the longitudinal center of the floor, and a supplemental side sloping upwardly and outwardly from the central part of the car, and a pendent door in the lower part of said supplemental side.

SPENCER OTIS.

Witnesses:
EDYTHE M. ANDERSON,
W. T. JONES.